United States Patent [19]

Wysocki

[11] Patent Number: 4,606,608

[45] Date of Patent: Aug. 19, 1986

[54] PROCESS AND APPARATUS FOR PREPARING GLASS FIBERS COATED WITH AMORPHOUS METALLIC ALLOY, AND FIBERS COATED THEREBY

[75] Inventor: Joseph A. Wysocki, Canard, Calif.

[73] Assignee: Hughes Aircraft Company, Los Angeles, Calif.

[21] Appl. No.: 697,826

[22] Filed: Feb. 4, 1985

[51] Int. Cl.⁴ .............................................. C03C 25/04
[52] U.S. Cl. .................................... 350/96.33; 65/3.3; 65/11.1; 350/96.34; 427/163; 428/381; 428/389
[58] Field of Search ................................. 65/3.3, 11.1; 350/96.33, 96.34; 428/381, 389; 427/165, 163, 383.5

[56] References Cited

U.S. PATENT DOCUMENTS 2,976,177  3/1961  Warthen ........................... 65/3.3 X
3,021,564  2/1962  Morgan et al. ....................... 65/3.3
4,407,561 10/1983  Wysocki .......................... 350/96.3
4,418,984 12/1983  Wysocki ......................... 350/96.33

Primary Examiner—Robert Lindsay
Attorney, Agent, or Firm—A. W. Karambelas

[57] ABSTRACT

A process and apparatus for preparing a glass fiber circumferentially coated with an amorphous metallic alloy, wherein the glass fiber is drawn to substantially its final diameter and then coated with amorphous metallic alloy. The coating is accomplished by passing the drawn glass fiber vertically through an opening formed between two circumferentially abutting, counter-rotating, circumferentially grooved rolls having a pool of a glass-forming alloy continuously supplied from a crucible and supported in the nip of the rolls adjacent the opening. The drawn glass fiber first passes through the pool of molten alloy and then immediately into the opening defined between the two rolls, whereby the metallic alloy coated onto the drawn glass fiber is rapidly cooled to form an amorphous coating.

14 Claims, 7 Drawing Figures

PROCESS AND APPARATUS FOR PREPARING GLASS FIBERS COATED WITH AMORPHOUS METALLIC ALLOY, AND FIBERS COATED THEREBY

BACKGROUND OF THE INVENTION

1. Field of the Invention

This invention relates to glass fibers coated with an amorphous metallic alloy, and, more particularly, to such a coated fiber useful as an optical waveguide.

2. Description of Related Art

Optical waveguides transmit light or other radiation from one point to another through the waveguide, with little loss of light intensity during transmission. One type of optical waveguide is manufactured as a glass fiber which has a central core of a doped glass having a high index of refraction and an annular outer cladding of glass having a lower index of refraction. Conversely, the doped glass may comprise the outer cladding with the central core undoped. In either case, light travels primarily along the optical waveguide in the central core. Light beams which tend to stray from the central core because of a bend in the optical waveguide or for other reasons are reflected back into the central core. The internal refraction is highly efficient, so that the over all transmission of light via the optical waveguide occurs with very little loss.

Optical waveguides are typically fabricated by first preparing a preform having a relatively large overall diameter, such as about 1 centimeter. The preform includes a core of one type of glass and an outer cladding of the other type of glass. The preform is usually prepared by doping the inside surface of a hollow glass tube, or by placing a glass tube over a glass rod. This preform is then heated and drawn to a very fine fiber diameter, such as about 0.1 millimeter. Such very fine glass fibers are strong, but are easily damaged by abrasion or scratching of the surface of the fiber and can be highly susceptible to stress corrosion damage. It is therefore important to protect the surface of the fiber from surface damage, and various types of protective materials have been utilized for this purpose. It has been proposed to coat the outer surface of glass fibers with a metallic coating, which would protect the surface of the fibers and also provide a significant hermetic jacket. See, for example, U.S. Pat. Nos. 4,418,984 and 4,407,561.

Optical waveguides are primarily utilized in two types of applications. In the first, the purpose of the waveguide is simply to transmit light from one point to another, with little loss of intensity, for the purpose of communications. In the second, the waveguide is used as a sensor element to detect the presence and strength of some external force or field by its effect on the light as it travels through the optical waveguide. In one such application, an optical waveguide fiber may be coated with a magnetostrictive metal so that the presence of small external magnetic fields is detected in phase shifting of the light travelling through the optical waveguide. The external magnetic field causes a magnetostrictive contraction in the external coating of metal, and this contraction alters the phase relationships of the light traveling through the optical waveguide, so that a correlation between the external magnetic field and the phase relationships may be made.

One class of candidates for metallic coatings for use on optical waveguides is amorphous, or glassy, metallic alloys. Amorphous metals have no long-range order, and therefore do not exhibit any crystalline structure, unlike most solid metals. Amorphous materials have been observed to be strong, of acceptable ductility for their strength, fatigue resistant, and corrosion resistant. Additionally, certain amorphous metallic alloys are magnetostrictive, or have other properties which are attractive in specific optical waveguide applications. Thus, it would be highly desirable to utilize amorphous metals as coatings for certain optical waveguide fibers.

The fabrication of amorphous metallic alloys requires specialized procedures wherein the metallic atoms are prevented from forming on a crystalline lattice in the usual fashion. In one fabrication approach, a liquid metal alloy is solidified at a very high cooling rate, on the order of $10^5$°C. per second. It has also been demonstrated that amorphous metallic alloys may be prepared by electrodeposition, vapor deposition, and similar specialized techniques.

Optical waveguide fibers having an amorphous metallic coating have been prepared by vapor depositing amorphous metal on the glassy surface, for a demonstration of magnetostrictive effects. However, this approach cannot be readily utilized for manufacturing long lengths of coated optical waveguides, since the vapor deposition process inherently is relatively slow. Coating by vapor deposition produces a very thin coating subject to failure. Existing vapor deposition techniques use apparatus which does not coat the fibers immediately after the glass surface is formed, so that the fiber surface may be damaged or degraded before it can be coated. Thus, vapor deposition techniques are not suitable for preserving the nascent strength of glass fibers coated with amorphous metals.

In an alternative approach, it has been proposed that coated optical waveguide fibers could be prepared by placing a layer of a non-amorphous metal alloy onto the surface of a preform prior to drawing the rod to a fiber. The coated preform would then be heated to a temperature greater than the melting point of the metallic alloy and rapidly drawn to a fiber by a die-less drawing procedure. It was proposed that, during the die-less drawing procedure, both the glass fiber and the outer metallic layer would be cooled so rapidly that the outer metallic layer would transform to its amorphous state, resulting in a glass fiber having external coating of an amorphous metallic alloy.

This proposed approach suffers from major drawbacks which make it impractical for preparing long lengths of coated optical waveguide fibers. First, the molten metal may simply melt and run off the fiber during processing. Second, the molten metal and the glass would be in contact for a relatively long period of time, between melting and solidification of the metal, resulting in extensive chemical attack of the glass. Third, it is believed that the procedure simply is inoperable in most situations to produce an amorphous outer coating, as the necessary high cooling rate cannot be achieved by convection and radiation of heat to the ambient atmosphere. Fourth, in this proposed approach, the drawing and elongation of the central glass fiber should continue after the metallic coating has solidified, but in fact the solidified metal prevents further drawing, or the ductility of the metallic coating is insufficient to maintain coating integrity during the drawing process. The amorphous metallic coating is therefore quite likely to fracture or interrupt the fiber drawing process. Fifth, the drawing temperatures of most glasses of interest in waveguide applications are not campatible with the proposed approach, and the drawing temperatures are usually much higher than the solidification temperatures of the glass-forming metallic alloys. Finally, it is particulary desirable that the metallic coating be placed on the glass fibers immediately after the fiber surface is formed, a condition not achieved by this described process.

No other techniques for forming an amorphous metal coating on a glass fiber are known. Accordingly, there exists a need for a process and apparatus for coating glass fibers with an amorphous metallic coating, immediately after the fiber surface is formed. Such a process and apparatus should provide for uniform coating of the optical waveguide fiber about its entire circumference, should have conditions favorable to producing an amorphous coating structure, and should allow the rapid, continuous and economic manufacture of long lengths of coated optical waveguide fiber by application of the amorphous metal to the pristine surface of the fiber immediately after the fiber is formed. The present invention fulfills this need, and further provides related advantages.

SUMMARY OF THE INVENTION

In accordance with the invention, a process and apparatus are provided for preparing a glass optical waveguide fiber coated with an amorphous metallic coating. The process and apparatus can produce long lengths of continuously drawn and coated fiber by a fully automated process, wherein the thickness of the fiber and the thickness of the coating may be controlled independently. Reproducible formation of an amorphous metallic coating is ensured by quenching a liquid layer of the alloy against a quench surface, so that the process may be controllably operated in an industrial environment.

The process of the invention for preparing a length of glass fiber coated with an amorphous metallic coating includes the steps of drawing a length of glass fiber; coating the length of drawn glass fiber with a glass-forming liquid metallic alloy to form a liquid coated fiber, the step of coating to occur immediately after, but continuously with, the step of drawing; and solidifying the liquid layer of the liquid coated fiber at a cooling rate sufficiently high to form an amorphous metallic coating on the glass fiber. Drawing of the glass fiber prior to coating is preferably accomplished without a die. Coating of the glass fiber is preferably accomplished by passing the drawn glass fiber through a pool of the liquid metallic alloy, and then cooling is preferably accomplished by passing the liquid coated fiber through an opening formed between two grooved, counter-rotating rolls. The linear drawing rate of this cotinuous apparatus is typically from about 0.5 to about 25 meters per second.

In a most preferred embodiment, a length of glass fiber coated with an amorphous metallic coating is prepared from a length of glass preform rod by heating a length of the preform; applying a load to the heated length to elongate the preform to form a drawn glass fiber; passing the drawn glass fiber vertically through the opening between a pair of grooved counter-rotating rolls, the rolls having a pool of liquid glass-forming metal held in the nip of the rolls above the opening, with the cross-sectional area of the opening being greater than the cross-sectional area of the drawn glass fiber, whereby metal from the pool is coated onto the drawn glass fiber as the drawn glass fiber passes through the pool of liquid metal, and the metal layer is rapidly quenched as the coated fiber passes through the opening. The grooved counter-rotating rollers do not act to reduce the cross-sectional area of the drawn glass fiber, but instead perform the functions of supporting the pool of liquid metal in the nip of the rolls and providing a quenching surface for rapidly cooling the metal alloy previously coated onto the drawn glass fiber as it passes through the supported pool of liquid metal. At a typical drawing speed of about 1 to 2 meters per second, the surface of the drawn glass fiber is formed in less than one second, and typically less than about 0.2 seconds, prior to contacting the freshly drawn glass surface to the pool of molten metal supported in the nip of the counter rotating rolls. The rapidly moving glass fiber draws a surface coating of the liquid metal through the opening defined by the grooves of the rolls. Thus, the surface of the drawn glass fiber does not have any substantial opportunity to become contaminated prior to metal coating.

Apparatus is provided to accomplish the processes described above.

It will now be appreciated that the process and apparatus of the present invention offer an advance in the area of coated glass fibers, whereby a freshly drawn glass fiber may be coated with an amorphous metallic coating in a continuous, controllable, and reproducible fashion. The glass fiber is drawn to substantially its final diameter prior to coating with the amorphous metallic coating, so that the coating is not strained and possibly fractured by further drawing after the coating is applied. Moreover, the coating may be applied uniformly around the circumference of the fiber simultaneously on all sides. Other features and advantages of the present invention will become apparent from the following more detailed description of the preferred embodiments, taken in conjunction with the accompanying drawings, which illustrate, by way of example, the principles of the invention.

DETAILED DESCRIPTION OF THE INVENTION

Figure 1:
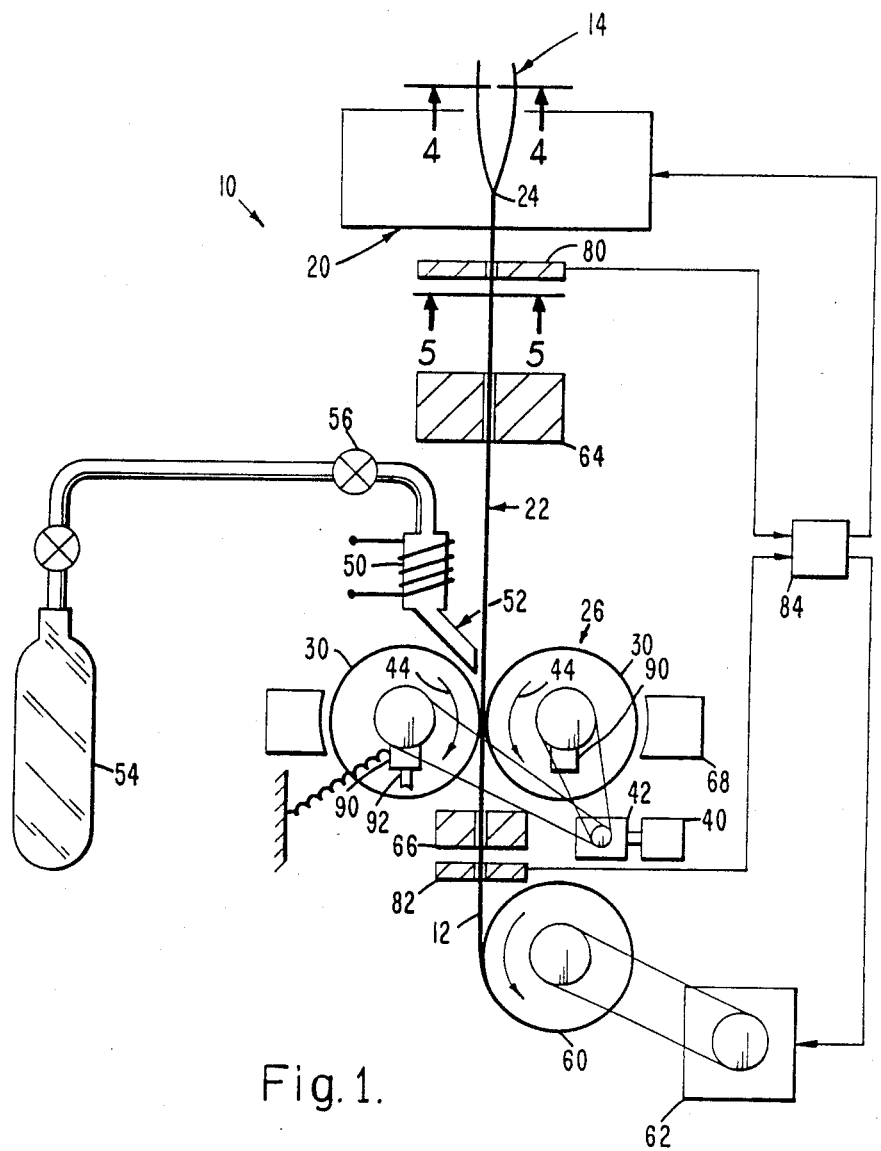
FIG. 1 is a side elevational view, partially schematic, of an apparatus in accordance with the present invention.

As illustrated in the drawings with reference to a preferred embodiment of the invention, the present invention resides in an apparatus 10 and process for preparing a coated fiber 12 from a glass preform 14. The preform 14 is preferably a glass composite having a glass core 16 concentrically located within a cylindrical glass cladding 18. Either the core 16 or the cladding 18 may be doped to alter the index of refraction, but for the purposes of this application, the presently preferred doped silica core and undoped silica cladding embodiment will be described in detail. The preform 14 may be prepared by any of several techniques known in the art, whereby a doped silica glass core 16 is created inside a pure fused silica cladding 18. In one such approach (not shown), for example, a dopant layer such as germanium oxide or phosphorus pentoxide is deposited on the interior of a hollow fused silica glass tube. Before subsequent drawing, the central opening is reduced and closed, and the dopant species are intermixed with the silica at the interior of the cladding. In another embodiment, a silica rod doped with appropriate species is placed within a hollow glass tube of pure silica. Other techniques for preparing the preform 14 will be known to those skilled in the art, and the present invention is operable with all such preforms 14. Suitable solid preforms 14 for use with the present invention may be purchased commercially.

Figure 3:
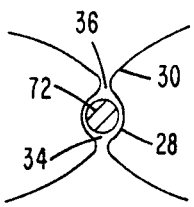
FIG. 3 is an enlarged bottom sectional view of the opening between the grooved rolls, taken generally along the line 3—3 of FIG. 2.
Figure 4:
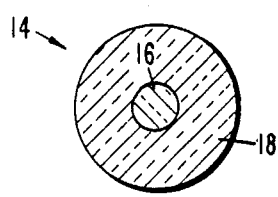
FIG. 4 is a schematic enlarged cross-sectional view of a preform prior to drawing, taken generally along the line 4—4 of FIG. 1.
Figure 5:
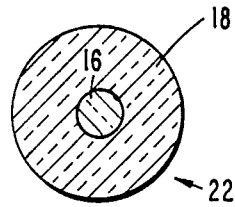
FIG. 5 is an enlarged cross-sectional view of a glass fiber after the drawing but before coating, taken generally along the line 5—5 of FIG. 1.

In accordance with the present invention, and as illustrated with reference to the preferred apparatus in FIGS. 1-3, the preform 14, illustrated in FIG. 4, is placed in a drawing furnace 20 to heat a portion of the preform 14 to a sufficiently high temperature that it may be drawn into a fiber, and an uncoated fiber 22, illustrated in FIG. 5, is drawn from a leading tip 24 of the preform 14. The drawing temperature for typical silica glass preforms is about 2000° to about 2500° C. The cross-section of the uncoated fiber 22 is a geometrically reduced reproduction of the preform 14, as illustrated in FIGS. 4 and 5, which differ only in that the actual diameter of the preform 14 is on the order to about 1 centimeter and the actual diameter of the uncoated fiber 22 is on the order of about 0.1 millimeter. The uncoated fiber 22 is drawn from the preform 14 at any suitable drawing rate compatible with application of a rapidly quenched coating, as will be described, but is preferably drawn at a linear drawing rate of about 0.5 to about 25 meters per second.

The uncoated fiber 22 is drawn vertically downwardly through a pair of counter-rotating rolls 26, whereat the uncoated fiber 22 is first coated with a liquid layer of metal and then cooled at a high cooling rate to solidify the liquid metal. The counterrotating rolls 26 are cylindrical in shape, with an axial length less than their diameter, and are oriented with their cylindrical axes parallel. Each roll has a circumferential groove 28 extending circumferentially around the outer diameter of the roll 26 along its cylindrical surface 30. The cylindrical surfaces 30 of the rolls 26 are in close facing proximity to each other, so that only a small gap 32 remains between the rolls, the gap typically being on the order of less than about 25 micrometers. The grooves 28 are disposed opposite to each other in a facing relationship, so that in cross section the grooves 28 form a substantially continuous opening 34 between the rolls 26, as illustrated in FIG. 3. Two diametrically opposed opening gaps 36 are present in the circumference of the opening 34, but this opening gap 36 is maintained at a very small size, typically on the order of less than about 25 micrometers, so that the surface tension of liquid metal prevents liquid metal leakage through the opening gap 36 and the roll gap 32. The rolls 26 are supported by pairs of bearing blocks 90. Preferably, one of the pairs of bearing blocks 90 is rigidly supported on a frame, while the other is mounted on a moveable, biased support, preferably a pivoting spring-loaded support 92. This support 92 allows the moveable roll to pivot outwardly and away from the rigidly supported roll, to facilitate cleaning, startup, and control of the thickness of the metallic coating on the fiber.

The rolls 26 are driven in a counter-rotating fashion by a motor 40 operating through a gear box 42, as indicated by the arrows 44 in FIG. 1. That is, the cylindrical surface 30 of each of the rolls 26 is rotated in the same direction as the direction of movement of the coated fiber 12, at the point of closest proximity between the fiber 12 and the cylindrical surfaces 30. The size and area of the opening 34 defined by the grooves 28 is greater than the cross-sectional size and area of the uncoated fiber 22, so that the primary purpose of the counterrotating rolls 26 is not to provide the primary drawing force for the uncoated fiber 22, although there may be some incidental drawing action of the counter-rotating rolls 26. Instead, as will be described subsequently, the primary function of the counter-rotating rolls 26 is to provide a movable chill surface for solidifying molten metal onto the surface of the fiber. In performing this function, the size of the opening 34 must be substantially larger than the size of the fiber 22, to leave room for the formation of a coating on the fiber, so that the rolls 26 cannot serve as the means of drawing the fiber 22 from the preform 14.

Figure 2:
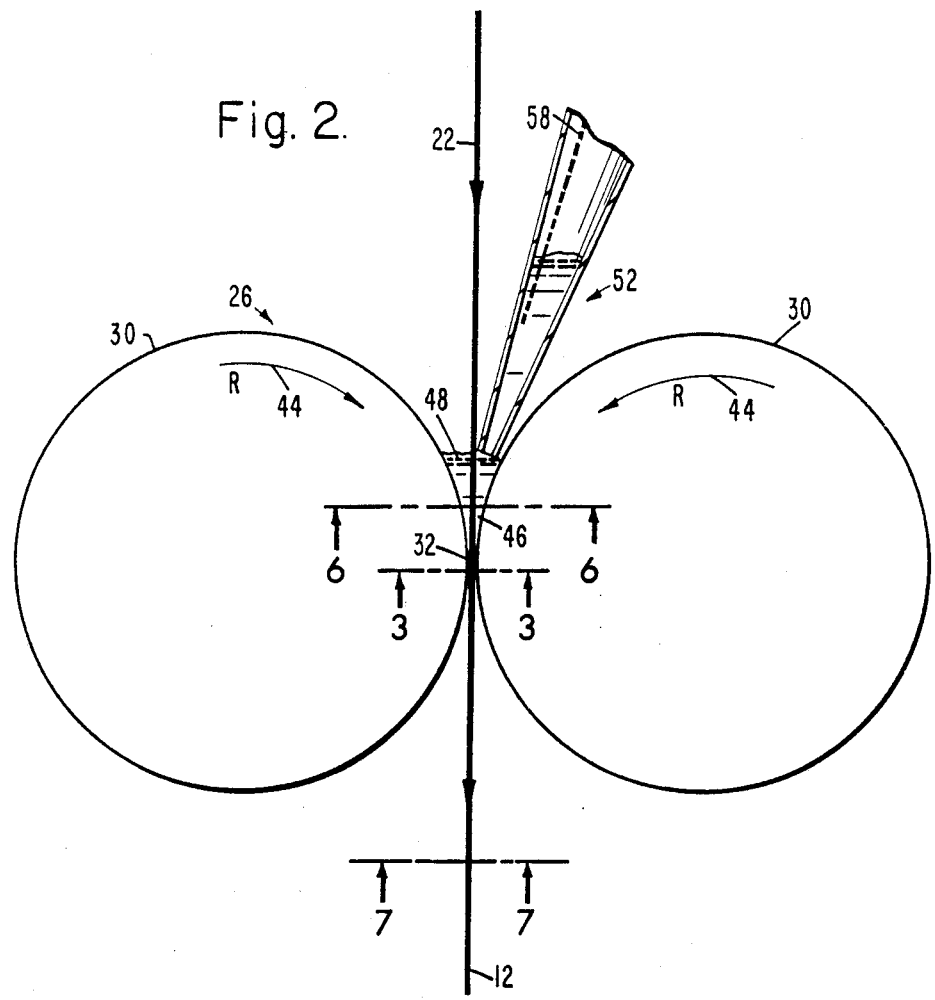
FIG. 2 is a detail of a portion of FIG. 1, near the nip of the counter-rotating rolls.
Figure 6:
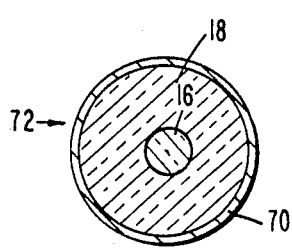
FIG. 6 is an enlarged cross-sectional view of a fiber after a layer of liquid metal is applied to the surface, taken generally along the line 6—6 of FIG. 2.
Figure 7:
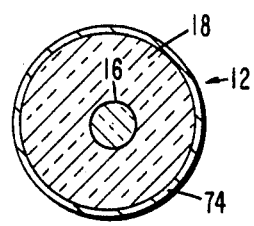
FIG. 7 is an enlarged cross-sectional view of a glass fiber after coating with an amorphous metal is completed, taken generally along the line 7—7 of FIG. 2.

As illustrated in FIG. 2, a liquid glass-forming metallic alloy is provided to an area above and between the rolls 26, directly adjacent the grooves 28 and thence adjacent the opening 34, termed the nip 46, to form a pool 48 of liquid metal through which the uncoated fiber 22 passes immediately prior to passing through the opening 34. A layer of liquid metal 70 is deposited onto the surface of the fiber to form a liquid-coated fiber 72 as the fiber passes through the pool 48, and the liquid is dragged with the moving fiber into the opening 34. As the liquid coated fiber 72 enters the opening 34, the liquid layer 70 comes into close contact with the surface of the grooves 28, so that heat is extracted from the liquid layer 70 into the rolls 26. The liquid layer 70 is rapidly cooled, thereby forming an amorphous metallic layer 74 on the surface of the coated fiber 12. FIGS. 6 and 7 illustrate sections of the liquid coated fiber 72 and the amorphous metal coated fiber 12, respectively.

The liquid metal forming the pool 48 is provided by any suitable means, and is preferably provided by a resistance furnace 50 through a delivery tube 52 which extends from the furnace 50 to a point directly adjacent the surface of the pool 48. The top of the furnace 50 is preferably closed so that the metal alloy contained therein is melted under a vacuum or controlled atmosphere to inhibit oxidation or other degradation of the liquid alloy. Liquid metal is supplied to the pool 48 through the delivery tube 52 from the furnace 50 by applying a pressure to the volume above the surface of the liquid metal, as from a pressure bottle 54 acting through a control valve 56. A liquid metal level sensor 58 senses the level of the liquid metal in the pool 48, so that when the level of liquid in the metal pool 48 drops below a preselected desired level, the control valve 56 is opened slightly to increase the pressure above the liquid metal in the furnace 50, thereby driving the liquid metal through the delivery tube 52 into the pool 48 to replenish the liquid metal in the pool 48. Alternatively, an operator may visually determine the level of the pool 48 and manually adjust the metal flow to the pool 48. The temperature of the metal in the pool 48 is controlled by adjusting the level of the pool, thereby altering the residence time of metal in the pool 48, and also by varying the temperature of metal delivered from the furnace 50.

A take-up drum 60 receives the coated fiber 12 after the fiber passes through the opening 34 between the rolls 26, and the coated fiber 12 is wound onto the take-up drum 60. The take-up drum 60 also supplies the primary drawing force for drawing the uncoated fiber 22 from the preform 14 and thence continuously through the pool 48 and the opening 34 between the counter-rotating rolls 26. The take-up drum 60 is driven by a motor 62 at a surface speed equal to the desired linear drawing rate of the coated fiber 12.

Preferably, the motor 40 driving the counter-rotating rolls 26 is adjusted to a speed whereat the surface velocity of the counter-rotating rolls 26 matches that of the take-up drum 60, so that the rolls 26 exert minimal axial force on the coated fiber 12 and the liquid coated fiber 72 during the drawing operation.

Optionally, the diameter of the uncoated fiber 22 and the coated fiber 12 may be monitored by diameter sensors 80 and 82, respectively. These sensors are conveniently constructed so that a collimated light beam such as a laser beam is broken by the fiber being measured. The total transmitted light intensity is then a calibratable indicator of the size of the fiber. The fiber diameters so measured may be recorded for information, or may be used as the input data for an active feedback control system to maintain the coated and uncoated fiber diameters at selected values. For example, the data from the sensors 80 and 82 may be provided to a controller 84, which in turn controls the temperature of the furnace 20 and the rate of fiber drawing as determined by the speed of the motor 62 operating the take-up drum 60.

In addition to the cooling means described, auxiliary cooling temperature control means may be provided in the apparatus 10. Specifically, an uncoated fiber temperature controller 64 may be provided to heat or cool the uncoated fiber 22 after it has been drawn from the preform 14 but before it enters the pool 48. Similarly, a coated fiber temperature controller 66 may be provided to heat or cool the coated fiber 12 after it has passed through the opening 34 of the rolls 26. A roll temperature controller 68 may be provided to heat or cool the counter-rotating rolls 26. Alternatively, the rolls 26 may be cooled internally, as by passing a coolant through the rolls. The temperature controllers 64, 66 and 68 are provided to stabilize or adjust the temperature of the fiber as necesary, to insure uniform coating of the fiber by the liquid metal in the pool 48.

In a typical start-up of the apparatus 10, the furnace 20 is heated and the length of fiber 22 is manually drawn from the leading tip 24 of the preform 14, and attached to the circumference of the take-up drum 60. During this start-up operation, one of the rolls 26 is retracted from the other on a movable support 92. The take-up drum 60 is brought to the desired drawing speed by the motor 62. The rolls 26 are next moved together so that the drawn fiber passes through the opening 34. The control valve 56 is activated to pressurize the furnace 50, thereby forcing liquid metal through the delivery tube 52 to form the pool 48. Subsequently, drawn fiber material is thence coated to become coated fiber 12. The apparatus 10 can continue in this steady operating mode substantially indefinite to draw long lengths of coated fiber 12, the only practical limitation being the amount of preform 14 available.

In its steady operating mode, the apparatus 10 drawns an uncoated fiber 22 from the preform 14, with the diameter of the uncoated fiber 22 being controllable by the temperature of the drawing furnace 20 and the drawing speed at the take-up drum 60. The diameter of the uncoated fiber 22 may typically range from about 25 to about 500 micrometers. The uncoated fiber 22 passes into the pool 48 of liquid metal, whereupon liquid metal is dragged along by the surface friction with the moving fiber into the opening 34. The thickness of the coating 74 on the coated fiber 12 is determined primarily by the dimension of the gap between the outer circumference of the uncoated fiber 22 and the circumference 38 of the opening 34, and by the drawing speed. For smaller coating thicknesses, the grooves 28 may be made smaller so that the circumference 38 is smaller and more nearly the same as that of the uncoated fibers 22. Conversely, a larger groove 28 leads to a thicker coating on the surface of the coated fiber 12. Thinner coatings are cooled more rapidly by contact with the surface of the groove 28, and the amorphous materials requiring higher cooling rates are produced with thinner coatings. Coating thicknesses typically vary in the range from about 10 to about 100 micrometers.

Experience has shown that it is preferable to move the uncoated fiber 22 directly and rapidly through the pool 48 and the counter-rotating rolls 26, as environmental exposure of the freshly prepared surface of the uncoated fiber 22 without a protective coating such as the amorphous metallic coating 74 can cause a degradation of properties, such as by attack of water vapor on the surface of the fiber, resulting in a loss of strength. The uncoated fiber 22 is thus coated with metal substantially immediately after its surface is formed. The distance between the drawing furnace 20 and the rolls 26 is made small and is typically about 1 meter. The drawing speed is also relatively high, but limits are placed on the drawing speed by two factors. The faster the draw rate, the smaller the diameter of the uncoated fiber 22, and the faster the passage through the opening 34, and thence the faster the cooling rate. Thus, the selected drawing rate is determined by considering the desired diameter of the uncoated fiber 22, the metal selected to form the coating 74, and the desired thickness of the coating 74 (which is also controlled by the size of the opening 34). While some variation is thus possible, drawing rates in the range of 0.5 to 25 meters per second are presently preferred, so that the freshly drawn surface of the uncoated fiber 22 is left uncoated for only about 0.04 seconds; for a typical spacing between the furnace 20 and the rolls 26 of 1 meter.

There is no known limitation as to the composition of either the glass fiber of the amorphous metal in the coating, except that the metal used in the coating must be capable of solidification into the amorphous state. The selection of the particular amorphous metal to be coated onto a drawn glass fiber will depend upon the particular application. For example, if the product is to be used as a magnetostrictive sensor for measuring magnetic fields, the amorphous alloy should be magnetostrictive amorphous material such as an alloy of 80 percent iron—20 percent boron, or (1-X)% iron—X% nickel—20% boron. Other magnetostrictive amorphous alloys may also be utilized where appropriate. In other applications, other amorphous metals may be found to be more appropriate as coatings, to take advantage of their particular characteristics.

It will now be appreciated that, through the use of the process and apparatus of the present invention, glass fibers coated with amorphous metallic alloys are readily and continuously prepared. The amorphous coating is applied to the surface of the drawn glass fiber substantially immediately after drawing, so that the surface of the freshly drawn glass fiber does not become contaminated with contaminents, such as water molecules and organic molecules, prior to coating. Although a particular embodiment of the invention has been described in detail for purposes of illustration, various modifications may be made without departing from the spirit and scope of the invention. Accordingly, the invention is not to be limited except as by the appended claims.

What is claimed is:

1. A process for preparing a length of glass fiber coated with an amorphous metallic coating, comprising the steps of:
   drawing a length of glass fiber;
   coating the length of glass fiber with a glass-forming liquid metallic alloy to form a liquid metal-coated fiber, said step of coating to occur immediately after, but continuously with, said step of drawing; and
   solidifying the liquid layer of the liquid-coated fiber at a cooling rate sufficiently high to form an amorphous metallic coating on the glass fiber.

2. The process of claim 1, wherein said step of drawing is accomplished without a die.

3. The process of claim 1, wherein the glass fiber comprises a central core of a first type of glass and a cladding of a second type of glass.

4. The process of claim 1, wherein said step of coating comprises the step of passing the drawn fiber through a pool of the liquid metallic alloy.

5. The process of claim 1, wherein said step of solidifying includes the step of passing the liquid-coated fiber through a cooled die.

6. The process of claim 1, wherein said step of solidifying includes the step of passing the liquid coated fiber between counter-rotating rolls.

7. The process of claim 6, wherein the rolls are grooved.

8. The process of claim 1, wherein the amorphous metallic alloy is magnetostictive in the amorphous state.

9. The process of claim 1, wherein the linear drawing rate is from about 0.5 to about 25 meters per second.

10. The process of claim 1, wherein the thickness of the metallic coating is from about 10 to about 100 micrometers.

11. A glass fiber coated with an amorphous metallic coating prepared by the process of claim 1.

12. A process for preparing a length of glass fiber coated with an amorphous metallic coating from a length of glass preform rod, comprising the steps of:
    heating a length of the glass preform rod;
    applying a load to the heated length to elongate the preform to form a drawn glass fiber; and
    passing the drawn glass fiber vertically through an opening between a pair of grooved counter-rotating rolls, the rolls having a pool of liquid glass-forming metal held in the nip of the rolls above the groove, and the cross-sectional area of the opening being greater than the cross-sectional area of the drawn glass fiber, whereby liquid metal from the pool is coated onto the drawn glass fiber as the drawn glass fiber passes therethrough and the metal is rapidly cooled as the coated fiber passes through the opening.

13. The process of claim 12, wherein said rolls are rotated at a surface speed substantially equal to the linear rate of travel of the drawn glass fiber.

14. A glass fiber coated with an amorphous metallic coating prepared by the process of claim 12.

* * * * *